Dec. 1, 1942.   R. O. DRAYTON ET AL   2,303,728
BABY BOTTLE RETAINER
Filed Aug. 12, 1940
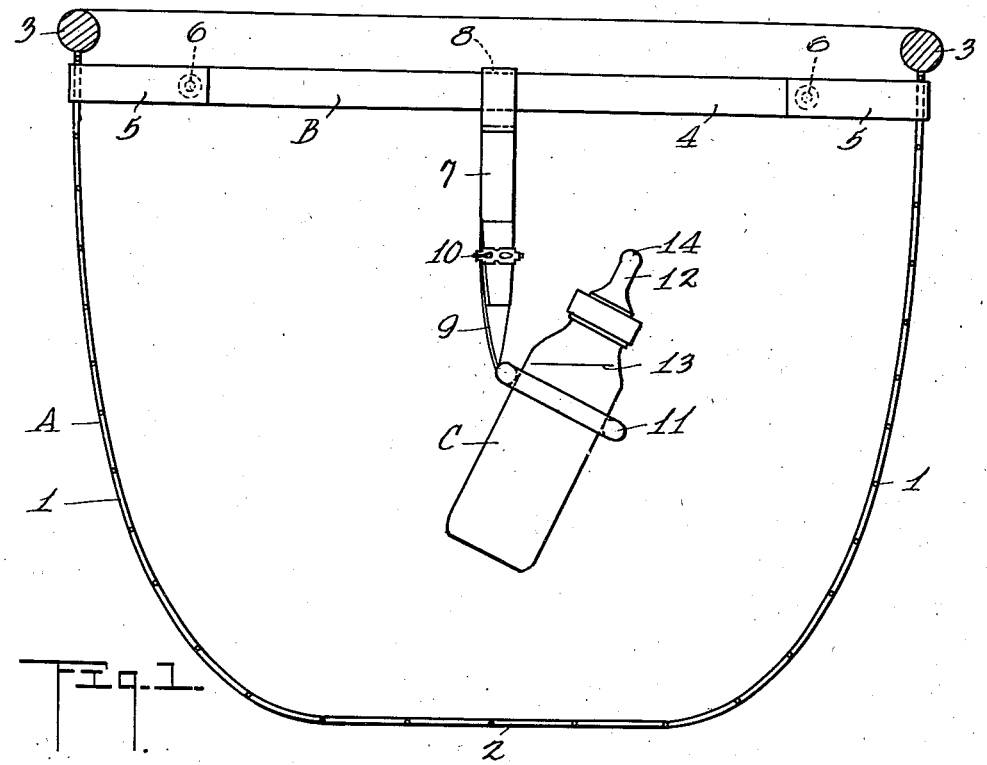
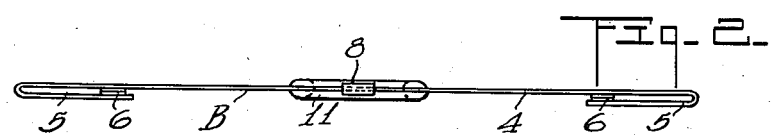
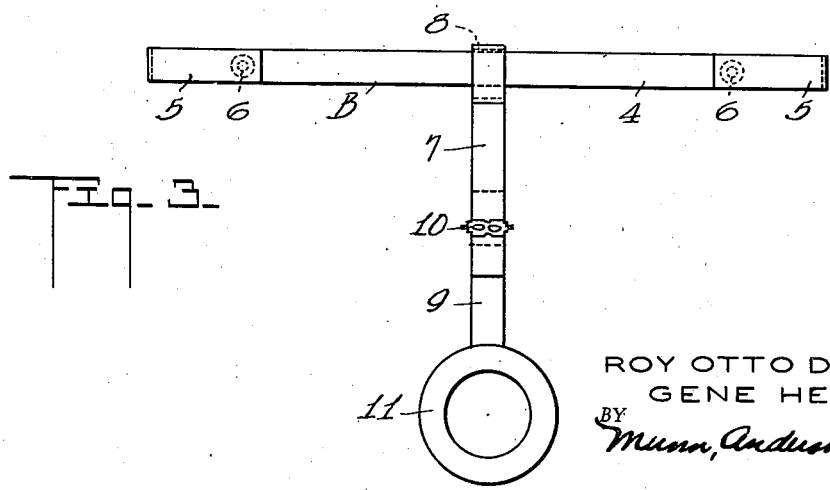
INVENTORS.
ROY OTTO DRAYTON.
GENE HENLEY
BY
ATTORNEYS.

Patented Dec. 1, 1942

2,303,728

UNITED STATES PATENT OFFICE 2,303,728

BABY BOTTLE RETAINER

Roy Otto Drayton, Sacramento, and Gene Henley, Woodland, Calif.

Application August 12, 1940, Serial No. 352,186

2 Claims. (Cl. 248—104)

The present invention relates to improvements in a baby bottle retainer, and it consists of the combinations, constructions and arrangement of parts hereinafter described and claimed.

An object of our invention is to provide a retainer that is adapted for attachment to the basket or crib of an infant and designed to have a baby bottle secured thereto. The retainer is so arranged as to permit the baby to nurse from the bottle and yet prevent the latter from being tossed out of the basket or crib.

It is further proposed in our invention to provide a baby bottle retainer that is flexible in character, thus allowing the bottle to be moved freely while the baby is nursing. The retainer is preferably made of material which may be sterilized from time to time, and thus maintain the bottle retainer in a sanitary condition.

A still further object resides in the provision of a baby bottle retainer that may be easily applied to the bottle, or removed therefrom. The retainer is adjustable so as to support the bottle at the desired position in the basket or crib. The bottle may be raised or lowered with respect to the bottom of the basket or crib, and also adjusted toward one side or the other of the basket or crib.

We also propose to provide a baby bottle retainer that will return the bottle to a substantially upright position upon the release of the bottle by the infant, thus preventing the milk from leaking out of the nipple on the bottle and into the bedding or clothing of the infant. The retainer is adjustable to fit baskets and cribs of different sizes.

Other objects and advantages will appear as the specification proceeds, and the novel features of our invention will be particularly set forth in the appended claims.

For a better understanding of our invention, reference should be had to the accompanying drawing, forming part of this application, in which:

Figure 1 is a transverse sectional view taken through an infant's basket and showing our bottle retainer applied thereto;

Figure 2 a plan view of the retainer detached from the basket; and

Figure 3 a front elevation of Figure 2.

While we have shown only the preferred form of our invention it should be understood that various changes or modifications may be made within the scope of the claims hereunto annexed without departing from the spirit of our invention.

In carrying out our invention, we make use of an infant's basket, which is indicated generally at A and including lattice sides 1 and bottom 2. The top of the basket is provided with a reinforced rim, as at 3. It should be made clear, however, that we do not wish to be limited to this particular type of basket, and further that a crib may be used instead of a basket. The basket that we have shown is for the purpose of illustration only.

Our baby bottle retainer is indicated generally at B in the drawing. The retainer includes a flexible horizontal strap 4, the ends of which may be secured to the sides of the basket or crib by any suitable fastening means. For this purpose, we have shown the ends of the strap 4 as being turned back upon themselves so as to provide loops 5. The loops may be engaged around reeds of the basket and fastened in place by snap fasteners 6 or the like.

It will be noted that the strap 4 has been shown in its natural or unstretched position in Figures 2 and 3. The strap has been stretched in Figure 1 so as to allow the loops 5 to be engaged around the reeds of the basket and, therefore, the strap will remain taut. The strap, of course, may be stretched so as to accommodate itself to baskets of various widths.

A vertical strap 7 has a loop 8 formed at its upper end, which receives the horizontal strap 4. The strap 7, therefore, may be moved toward or away from either side of the basket for the purpose hereinafter described. A second vertical strap 9 is adjustably secured to the strap 7 by a snap buckle 10, or by any other suitable means. A bottle-encircling ring 11 is secured to the lower strap 9 and may be formed integral therewith.

The ring 11 is preferably formed of the same material as teething rings in order to remain sanitary and also to prevent injury to the infant's teeth. It is possible for the ring 11 to be used as a teething ring when not supporting a bottle. The ring 11 may be telescoped over a bottle C in the manner shown in Figure 1. The ring will yieldingly engage with the bottle and may be adjusted vertically along the bottle. The ring 11 should be adjusted relative to the bottle so that the nipple 12 will be above the milk line 13 in the bottle when the latter is released by the infant. The opening in the nipple has been indicated at 14. If the bottle is partly empty, it may be advisable to adjust the ring 11 higher on the bottle so as to insure the nipple being elevated sufficiently when the bottle is released and thus preclude the milk from leaking out of the nipple.

In order to allow the straps 4, 7 and 9 to be sterilized from time to time, they should be made of rubber or the like that will withstand being sterilized in hot water. The bottle-engaging ring should also be fashioned from material that can be dipped into hot or boiling water.

Having thus described the various parts of our baby bottle retainer, the operation thereof may be readily understood. The loop 8 of the vertical strap 7 is slipped over the horizontal strap 4 and then the loops 5 of the latter strap are engaged with suitable opposing parts of the basket A or with the crib. The bottle C is now inserted through or into the ring 11 and adjusted relative thereto. The snap buckle 10 will permit the straps 7 and 9 to be adjusted relative to one another so as to position the bottle at the proper height above the bottom of the basket or crib.

The straps 7 and 9 are flexible and will allow the bottle to be positioned properly for nursing by the infant. In order to place the bottle in an out-of-the-way position, the bottle may be slid to one side or other of the basket or crib by merely sliding the loop 8 along the strap 4. The entire bottle retainer B may be removed from the basket or crib with facility and ease.

We claim:

1. In combination, an infant's basket or the like, a strap secured substantially horizontally thereacross in spaced relation with the bottom of the basket, a second strap depending from the first strap and having a bottle-engaging ring secured thereto, the second strap including sections adjustably secured together, whereby the height of a bottle in said ring may be adjusted relative to the bottom of the basket, the second strap being adjustable along the length of the first strap to allow the bottle in said ring to be adjusted toward one end or the other of the first-named strap.

2. A baby bottle retainer comprising a strap having ends made to be turned back upon themselves to form loops, means for securing the turned-back ends to the body of the strap, a second strap having its upper end provided with a loop slidable along the length of the first strap, the second strap having adjustable sections whereby the length of the second strap may be changed, and a bottle-engaging ring fastened to the lower end of the second-named strap, the ring being used as a teething ring when not supporting a bottle.

ROY OTTO DRAYTON.
GENE HENLEY.